United States Patent [19]

Zinsmeyer

[11] Patent Number: 4,535,592
[45] Date of Patent: Aug. 20, 1985

[54] INTERNAL COMBUSTION ENGINE HAVING AN EXHAUST GAS TURBINE

[75] Inventor: Herbert G. Zinsmeyer, Austin, Tex.

[73] Assignee: Specialty Systems, Inc., Austin, Tex.

[21] Appl. No.: 484,208

[22] Filed: Apr. 12, 1983

[51] Int. Cl.³ .............................................. F02B 41/10
[52] U.S. Cl. ........................................ 60/597; 60/624
[58] Field of Search .................. 60/597, 598, 605, 624

[56] References Cited

U.S. PATENT DOCUMENTS

| | | |
|---|---|---|
| 995,348 | 6/1911 | Held . |
| 1,176,207 | 3/1916 | Dempsey .......................... 60/624 X |
| 1,849,170 | 3/1932 | Buchi ................................ 60/605 |
| 1,921,907 | 8/1933 | Buchi . |
| 1,963,780 | 6/1934 | DuBois . |
| 2,176,021 | 10/1939 | Grutzner ............................... 60/624 |
| 2,245,163 | 6/1941 | Smith . |
| 2,624,171 | 1/1953 | Kollsman ............................. 60/597 |
| 2,858,666 | 11/1958 | Fullemann . |
| 2,932,156 | 4/1960 | Eckert et al. . |
| 2,982,087 | 5/1961 | Foster . |
| 3,029,594 | 4/1962 | Miller . |
| 3,673,798 | 7/1972 | Kuehl . |
| 4,019,324 | 4/1977 | Coxon et al. ..................... 60/598 X |

FOREIGN PATENT DOCUMENTS

| | | | |
|---|---|---|---|
| 724469 | 8/1942 | Fed. Rep. of Germany ........ 60/624 |
| 975375 | 11/1961 | Fed. Rep. of Germany ........ 60/605 |
| 52624 | 3/1982 | Japan .................................... 60/605 |
| 372556 | 5/1932 | United Kingdom .................. 60/597 |

*Primary Examiner*—Michael Koczo
*Attorney, Agent, or Firm*—Wofford, Fails & Zobal

[57] ABSTRACT

An advanced turbo compound engine of internal combustion type having conventional reciprocally movable pistons, cylinders, manifolds, fuel-oxygen admixing apparatus or fuel injection, firing apparatus or compression ignition, and incorporating the improvement of respective nozzle means for conveying the hot, moderately high pressure combustion products (exhaust gases) from the respective cylinders to one or more turbines, the nozzle means having its inlet and discharge ends connected, respectively, with the respective boundary walls of respective combustion chambers or cylinders and with the inlet to a turbine. The turbine may have its shaft connected with a compressor for compressing at least air for intake to the engine and/or for connecting with the output shaft of the engine for assisting in delivering power that is used as desired, or connected to other auxiliary power needs.

4 Claims, 10 Drawing Figures

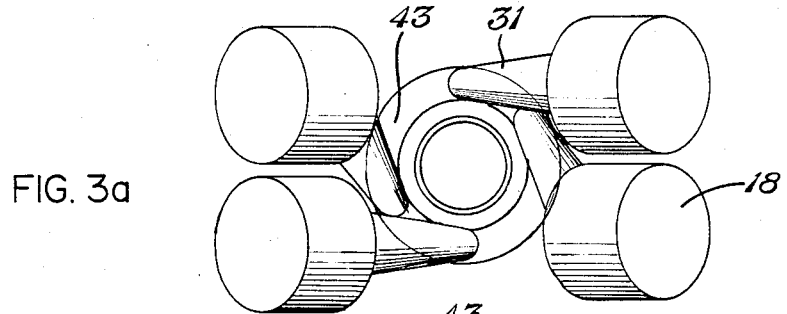
FIG. 3a
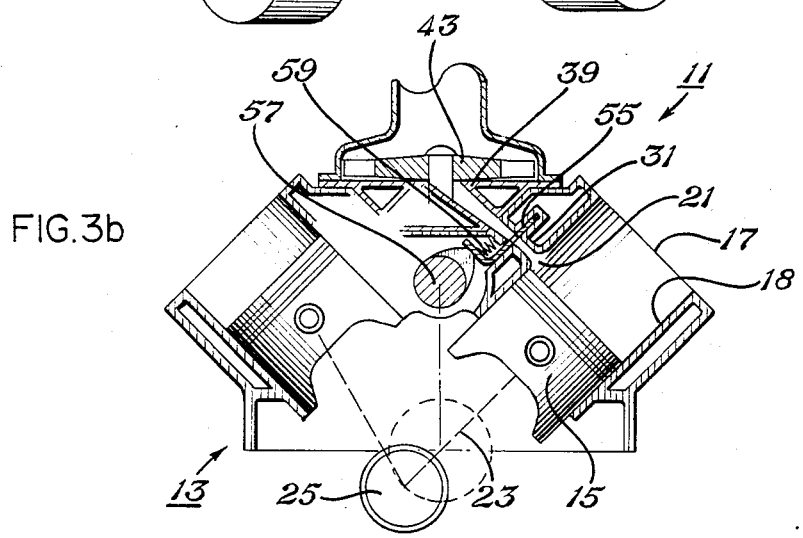
FIG. 3b
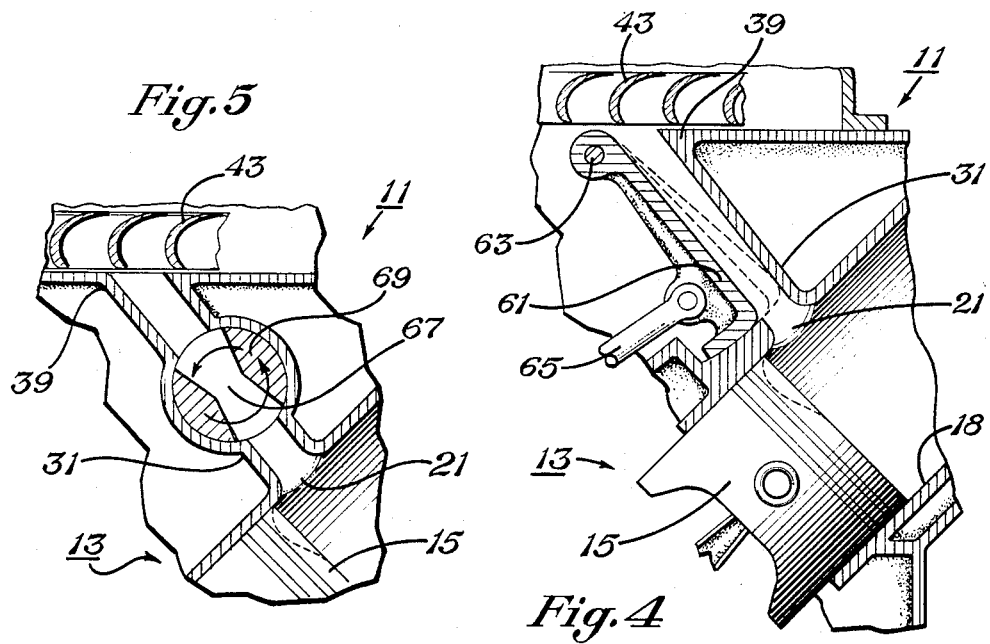
Fig. 5
Fig. 4

INTERNAL COMBUSTION ENGINE HAVING AN EXHAUST GAS TURBINE

FIELD OF THE INVENTION

This invention relates to internal combustion engines and, more particularly, to advanced turbo compound engines having more efficient use of the exhaust gases by one or more turbines employed with the engine.

DESCRIPTION OF THE PRIOR ART

In the prior art there have been a wide variety of turbo charged engines in which the exhaust gases have been exhausted through turbines to turn compressors or the like for compressing the air for fuel-air mixtures in the engine, as well as compounding with the engine crankshaft. In these prior art type of engines employing exhaust turbines, there was an exceptionally large percentage of irreversible pressure losses, due to throttling of the exhaust gases, and other irreversible losses before the reduced pressure, hot exhaust gases were vented through the turbine to give up their energy. Typical of the prior art turned by a preexamination search are the inventions shown in the following U.S. patents. U.S. Pat. No. 995,348 describes a dynamic two-cycle motor in which a momentum type purge wheel is employed to assist in scavenging the exhaust gases. U.S. Pat. No. 1,504,187 describes carburetion for an internal combustion engine in which fuel is vaporized and admixed with the air. U.S. Pat. No. 1,921,907 has only to do with arrangement of components for obtaining a "compact arrangement", no thermodynamic considerations are mentioned or claimed. U.S. Pat. No. 1,963,780 shows a turbo compressor for internal combustion engine power unit in which the exhaust gases drive a turbine for compressing inlet air or fuel-air mixture for end of stroke charging only. U.S. Pat. No. 2,245,163 describes a power plant for aircraft in which a turbine is operationally connected on the discharge side of the engine to either drive the compressor for the aircraft engine or to compound with the engine or both. U.S. Pat. No. 2,858,666 relates somewhat to more efficient use of exhaust gas energy for driving turbocharger on two-cycle engine. U.S. Pat. No. 2,932,156 describes porting to avoid exhaust pulse interference. U.S. Pat. No. 2,982,087 has only to do with free-piston gas generators and compressors. U.S. Pat. No. 3,029,594 shows matched turbo charger and engine. U.S. Pat. No. 3,673,798 describes good design arrangement but does not relate to the "problem" of irreversibility losses in recovering energy from exhaust gases. U.S. Pat. No. 3,913,542 has to do with simplified turbocharger controls. From these patents, it can be seen that the prior art does not significantly address the problem of irreversibility of losses in recovering exhaust gas energy. Only U.S. Pat. No. 2,858,666 addresses the desire to get more energy output from the turbine and then only for turbocharging two cycle engines. Moreover, texts on engine design, theoretical engine cycles and idealized cycles and processes, compressors, exhaust turbines and heat exchangers and machine elements have described a need for a solution to these irreversible losses. Edward Obert in his text, INTERNAL COMBUSTION ENGINES AND AIR POLLUTION, "Idealized Cycles and Processes", Harper and Rowe, N.Y., 1973, writes "in the real engine only a fraction (about 20%) of the blowdown work . . . can be realized because the real process is irreversible." Charles Taylor in his text THE INTERNAL COMBUSTION ENGINE IN THEORY AND PRACTICE, second edition, MIT Press, Mass., 1967, volume 1, page 386, writes "In practice, it is difficult to realize more than a modest fraction of the theoretical blowdown energy for the following reasons:

1. The unsteady nature of the flow through the turbine
2. Pressure losses in the exhaust valve or ports
3. Heat losses between the exhaust valve and turbine"

Taylor notes in volume 2 that gains are possible but does not delineate the solution described and claimed hereinafter.

Thus it can be seen that while the prior art recognized the problem, there was no pragmatic solution proposed to reduce these irreversible losses that produced inefficiency in recovering the total energy of the exhaust gases and converting a large portion to useful power.

SUMMARY OF THE INVENTION

Accordingly, it is an object of this invention to provide apparatus that enables recovering a relatively high percentage of the available energy from the exhaust gases from an internal combustion engine, not heretofore possible.

Specifically, it is an objective of this invention to provide one or more turbines so arranged and connected with the respective cylinders as to lower the irreversible losses and enable recovering a much higher proportion of the available energy in the exhaust gases than has been recovered by the prior art apparatus.

These and other objects will become apparent from the following descriptive matter, particularly when read in conjunction with the appended drawings.

In accordance with this invention there is provided an improvement in a combination with a conventional internal combustion engine. As is recognized the internal combustion engine will have cylinders having respective combustion chambers defined therewithin between the cylinder head and the pistons. Respective inlet and exhaust manifold means are provided. Carburetor means or the like is provided for admixing incoming fuel with oxygen-containing gas. Ignition means is provided for firing the fuel interiorly of the combustion chamber. Exhaust ports are provided for periodically discharging hot, high velocity combustion products from the combustion chambers interiorly of the cylinder. The improvement comprises having at least one respective nozzle means whose inlet is contiguous the cylinder wall and whose outlet is contiguous a turbine for all practical purposes, so as to deliver the hot high pressure exhaust gases from the cylinder at the inlet to the nozzle, to the turbine inlet with minimum energy loss and maximum velocity, thereby maximizing the kinetic power input to the turbine. Specifically, the exhaust gases in the cylinder will give up their remaining energy with much lower irreversible losses than have been possible in the prior art.

As will be understood, the specific structure has the inlet to the nozzle means encompassing the discharge port from the respective cylinder and has its discharge end, within practicality, contiguous the inlet passageway of the turbine. As implied hereinbefore, there may be a single turbine having a plurality of inlet ports connected with respective plurality of nozzle means to provide more efficient and more nearly constant flow of combustion products through the turbine. On the other hand, there may be employed a plurality of respective turbines within a single engine, each with their inlet passageways connected with the discharge ends of the nozzle means of selected cylinders for efficient use of the power in the combustion products. The term "combustion products" is employed herein to designate the exhaust, or discharge, products that include the products of combustion, like carbon dioxide, water and carbon monoxide, and include the other hot gases such as nitrogen, nitrous oxides and the like that may have an elevated enthalpy because of their elevated temperature and pressure when discharged from the cylinder. Other terms that are used synonymously herein with the combustion products include exhaust gases, and discharge products.

As implicit in its stated objects, this invention shows means to efficiently expand the cylinder exhaust gases from the conditions interiorly of the cylinder to atmospheric pressure in the process that is as near to reversible adiabatic (isentropic) as is possible, thereby maximizing the resulting secondary energy being recovered in terms of mechanical shaft power that can be connected to drive a secondary shaft to supplement propulsion, drive accessories or supply other power needs, such as being connected to supplement the main crankshaft power. The connection of the turbine mechanically to the engine crankshaft is not mechanically simple due to characteristic speed differences but is illustrated and described in more detail hereinafter.

BRIEF DESCRIPTION OF THE DRAWINGS

FIG. 3a is a schematic illustration including partial side elevational view in partial cross section of one embodiment of this invention showing a cylinder side port with a nozzle-sleeve-valve and a centrally disposed turbine.

FIG. 3b is a schematic illustration including a top view of the embodiment of FIG. 3a.

FIG. 4 shows a variable geometry nozzle-throat-valve in the cylinder side port embodiment of this invention.

FIG. 5 shows a nozzle-slot-valve through a timed rotating shaft in accordance with another embodiment of this invention.

DESCRIPTION OF PREFERRED EMBODIMENTS

Figure 1:
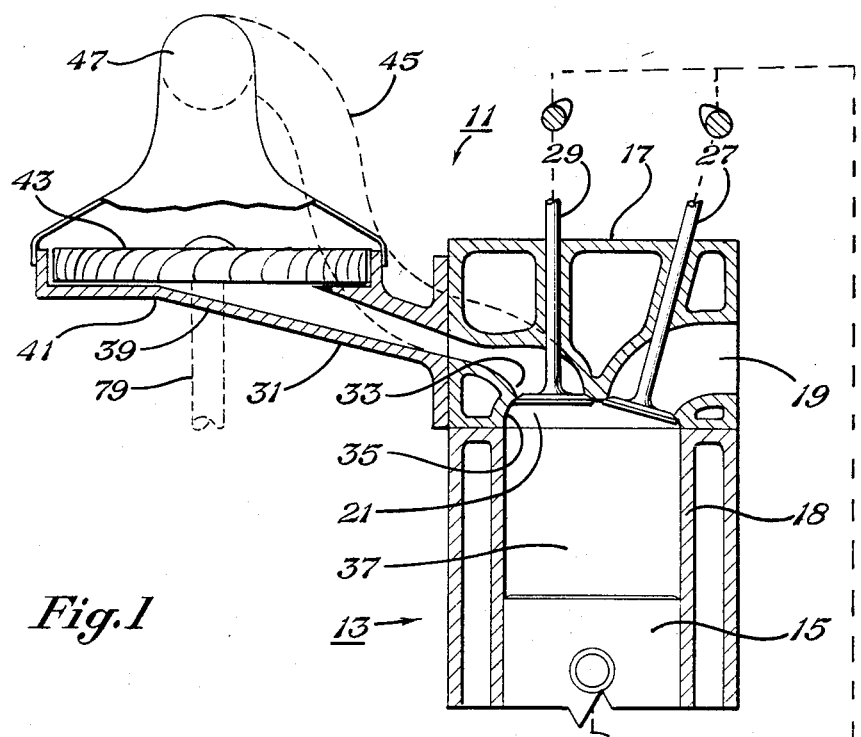
FIG. 1 is a partial cross sectional view illustrating an exhaust turbine arrangement using a first nozzle-valve with a second conventional valve to exhaust the residual gases, the second conventional valve being implicit by the dashed lines showing venting directly to exhaust.

It is believed helpful to reiterate and emphasize some of the theoretical considerations before looking at the various embodiments of this invention. Because of the inherent nature of the lower compression and expansion ratio (the compression ratios being limited by octane requirements), the practical spark ignition engines dump a greater portion of the total energy into their exhaust. Because of these characteristics, the efficient use of full and useful expansion to atmospheric pressure as in the design of this invention, will likely bring greater relative improvement to the spark ignition engine than to the diesel; although it can be employed advantageously with the diesel.

It should be borne in mind that the internal combustion engines will, ordinarily, employ a plurality of respective cylinders and pistons connected with a common crankshaft. To simplify description and understanding of this invention, however, the simplest embodiments illustrating a single cylinder, piston, nozzle, valve and turbine will be illustrated and described in the earliest embodiments such as FIGS. 1–5.

Referring to FIGS. 1–4 for the general description of the internal combustion engine, the combination 11 includes internal combustion engine 13 that, in turn, includes at least one respective reciprocally movable piston 15, cylinder 18, at least one respective cylinder head 17 mounted respectively on the cylinder and enclosing the end of the cylinder to define a combustion chamber for the piston, an inlet manifold means 19 connected with the cylinder for conveying at least an oxygen-containing gas thereto, means for admixing incoming fuel with oxygen-containing gas, ignition means for firing the fuel and the oxygen-containing gas to develop power and exhaust port 21 for periodically discharging hot, high pressure combustion products from the cylinder, the exhaust port being disposed in a respective boundary wall of the combustion chamber, at the top or the bottom. The boundary wall may be the cylinder head as in FIGS. 1 and 2, or it may be the cylinder wall, as in FIGS. 3–5.

The internal combustion engine 13 may comprise any of the internal combustion engines, as indicated hereinbefore, and of the two stroke or four stroke cycle design. Typically, it comprises the gasoline type internal combustion engine having a spark plug or the like to ignite the fuel in the fuel-air mixture to develop power. If desired, it may comprise the compression ignition type engines, with or without glow plugs or catalysts to assist in initiating combustion when the pressure and temperature are high enough, as in a diesel cycle engine. The spark plugs for igniting the fuel, the carburetor means for admixing fuel and air, or alternatively, the pressure injection for injecting fuel into the pressurized air, are all conventional and well known and illustrated and do not require illustration and description herein. Consequently, they have been omitted from FIGS. 1–4 for simplicity.

Similarly, the piston 15 is also well known. Ordinarily it has rings around its periphery to prevent blowby of the high pressure fluids developing the power following ignition and combustion. The piston, as can be seen, is ordinarily connected by piston rods shown by dashed lines 23, FIG. 3 with a crank shaft 25 that has respective throws and rotates about an axis. The engine crank shaft 25, FIGS. 1, 3 and 8, serve to deliver power from the engine as to drive an automatic transmission or the like; and serves for setting cams, such as 30, 32, FIG. 1 and 57, FIG. 3.

Of course, other means are also employed to drive accessories. For example, fan belts or the like are employed to drive air or refrigerant compressors, generators, alternators, power steering pumps, water pumps and the like. Again these are all conventional, all are relatively immaterial to this invention and need not be described in detail herein.

The cylinder 18 may comprise any of the well known engine cylinders for the area of technology (aircraft, automotive, rail, marine, stationary, etc) for which the engine will be employed. It may be air cooled or liquid cooled. The respective cylinders and the cylinder heads and their respective sealing interconnection with gaskets, stud bolts and the like, are well known and need not be described herein in detail. Respective passageways are provided for cooling fluids, lubricating oils and the like in conventional practice and in this invention.

Figure 2A:
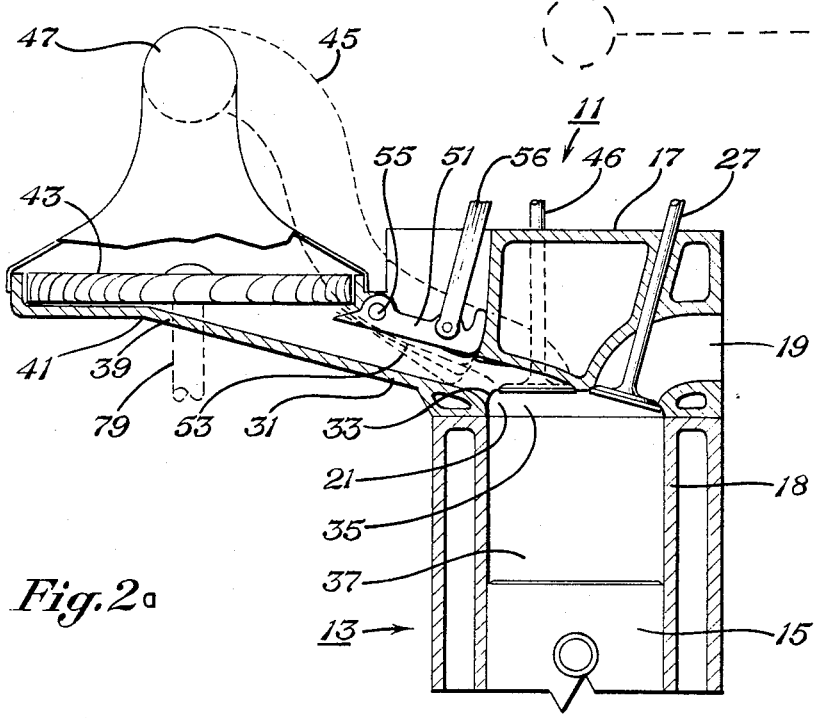
Fig. 2a is a partial cross sectional view illustrating turbine supplied by a variable nozzle-throat-valve, with a second conventional valve to exhaust the residual gases.
Figure 2B:
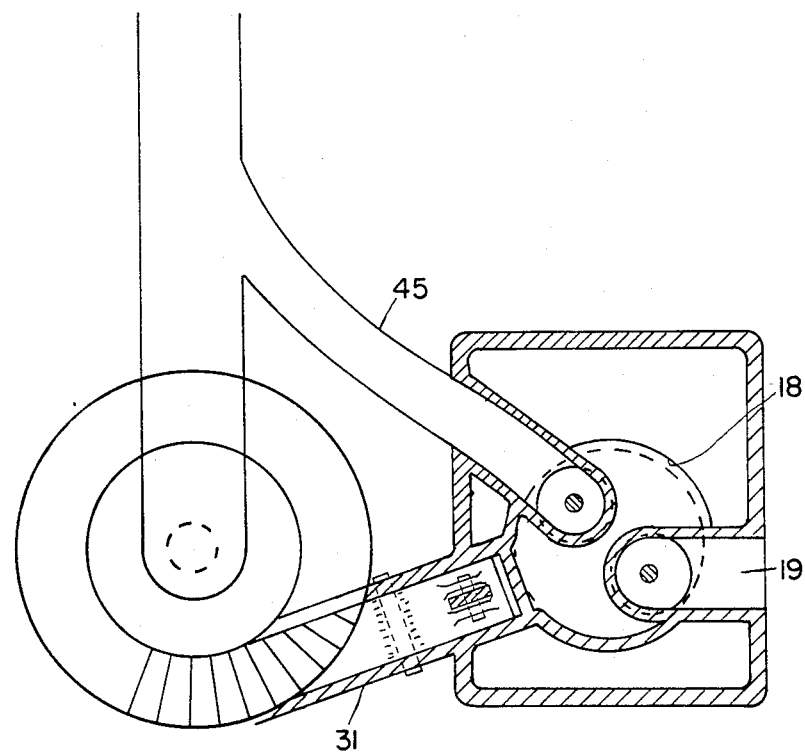
FIG. 2b is a partial cross-sectional view of FIG. 2a, and shows the arrangement of the three valves.

Similarly, an inlet manifold means is provided to conduct at least oxygen-containing gas and, ordinarily, a mixture of fuel in the oxygen-containing gas; such as fuel and air mixture in a spark ignition engine to the combustion chamber for developing power when ignited for the power stroke. Any of the conventional manifold means for conveying air and fuel into the cylinder may be employed in this invention. As illustrated in FIGS. 1 and 2 the intake manifold is formed in the cylinder head and has a poppet valve 27 for opening to admit the fuel-air admixture at an appropriate time dictated by cams operated by a cam shaft or the like.

In similar manner, an exhaust port 21 is provided at the upper or lower part of the cylinder to vent the combustion products after combustion. In four-cycle engines, ordinarily, a valve means of some sort is provided at the exhaust port to open and allow the combustion products to flow out into the discharge manifold. On the other hand, in two-cycle engines, the exhaust port 21 often is opened or uncovered by a downward movement of the piston 15. This side port can include four cycle engines as well, and such design is shown in FIGS. 3-5.

It is at this point that the respective advantages of this invention are brought into play to provide a surprisingly high percentage recovery of the available energy from the combustion products.

Referring to FIG. 1, two exhaust valves are provided. The first nozzle valve 29 of the two exhaust valves opens as the piston approaches the bottom of the power stroke (expansion). This nozzle, or blowdown valve 29 is very quick opening and admits exhaust gas from the cylinder to its respective turbine nozzle 31. The turbine nozzle 31 has its inlet end 33 contiguous the boundary wall 35 of the combustion chamber 37 adjacent the exhaust port 21 and sealingly encompassing the exhaust port 21 so as to prevent leakage of the hot, high pressure combustion products to the atmosphere. The nozzle 31 has its discharge end 39 connected with the inlet 41 of a turbine 43. Expressed otherwise, the turbine 43 has its inlet passageway adapted to smoothly receive the combustion products from the discharge end 39 of the nozzle 31 and minimize irreversible losses, pressure drop and the like before the energy is given up to the turbine 43. The nozzle shape is designed to match the pressure and flow conditions so as to maximize efficiency of energy recovery.

The turbine 43 may comprise any turbine that can efficiently use this type of intermittent flow of combustion products. Ordinarily, the blowdown turbine design is best and eliminates the engine pumping loss penalty and minimizes irreversible flow losses. Expressed otherwise, the design of the nozzle at its throat and at both of its inlet and discharge ends in combination with the inlet passageways of the turbine is to deliver as much as possible of the kinetic and thermal energy in the combustion products and maintain adequate scavenging of the combustion products from the cylinder. Moreover, they are designed to place the turbine as closely as possible to the cylinder exhaust ports (just a nozzle length away) so that the frictional irreversible flow losses in piping in the prior art do not interfere with efficient operation in this invention. The turbine nozzle throat is sized and shaped to best convert the combustion products and their enthalpy to kinetic energy as quickly as possible and as efficiently as possible. The quick opening valve 29 is sized as large as possible relative to the nozzle throat size so as to minimize "throttling".

A second smaller poppet valve and alternate flow passageway, illustrated schematically in FIG. 1 by the dashed lines 45 and visible in FIG. 2 as 46, opens at some position later in crankshaft rotation after most of the useful exhaust gas energy is expended through the nozzle 31 and the turbine 43. Specifically, the second exhaust valve opens while the first valve 29 begins to close. The second exhaust valve discharges the relatively low pressure residual gases directly to the exhaust pipe 47 serving as the exhaust manifold. Thus these gases pass directly to atmosphere, and bypass the turbine. It may prove practical to eliminate this second exhaust valve.

Other arrangement of the dual exhaust valving in the upper cylinder head using conventional poppet valves, sleeve valves or other types of valves are possible, employing sequenced opening as described hereinbefore.

Referring to FIG. 2, the same respective elements in the basic engine are employed, along with the turbine 43, the exhaust manifold 47 and the alternate residual gas passageway and valve 45, 46. In the embodiment of FIG. 2, the second valve 46 can be seen because the first valve 29 is not employed. Instead, there is employed a valve 51 placed at the nozzle throat and made a part of the throat of the nozzle 31. As can be seen in the dashed lines 53, the pivoting valve 51 may be moved toward its closed position around its pivot shaft 55 by a push rod 56 as from a cam or the like. This allows opening the valve readily and produces smooth flow of the combustion products through the nozzle 31 during all stages of opening. As discussed hereinbefore, the nozzle entrance, or inlet, 33 is contiguous and a part of the boundary wall 35 of the combustion chamber 37. Actually in the embodiments of FIGS. 1 and 2, the inlet of the nozzle is located in the cylinder head adjacent the discharge port 21. The design of FIG. 2 is more easily made to optimally vary the nozzle contour during blowdown beginning from high pressure (producing supersonic flow through a converging-diverging nozzle), and decaying to approach atmospheric pressure when the nozzle valve becomes fully open with the desired simple converging nozzle contour. As indicated hereinbefore, the inlet 41 of the turbine 43 combines to produce smooth flow and minimal irreversible losses because of "throttling", piping losses and the like.

The second valve 46 and the exhaust flow passageway shown by dashed lines 45 operate as described hereinbefore with respect to FIG. 1 to allow the residual gases to be scavenged from the cylinder and not interfere with efficient development of power in the engine 13. As in FIG. 1, it may prove more practical to eliminate the second valve 46 by allowing the nozzle valve to remain open to the turbine through the full exhaust cycle.

In the embodiments of FIGS. 1 and 2, the nozzle is shown with its inlet end forming an integral part and contiguous the boundary wall formed by the cylinder head. In many engines such as two-cycle engines and the like, it is possible to have the nozzle inlet end form a part of and be contiguous a side wall of the cylinder or the like, as illustrated in FIGS. 3–5 for example, the commonly used exhaust side ports on most two-cycle engines will be formed in this way. In this invention, the side port 21 is shaped and forms an integral smooth inlet end for the nozzle 31 and is sized to efficiently discharge the combustion products from the cylinder through the nozzle 31 and against the adjacent turbine 43 at the discharge end 39 of the nozzle. This can be applied to four cycle engines as well as with the dual exhaust valving.

Referring to FIG. 3, the cylinders 18 operate conventionally with their respective reciprocating piston 15 therewithin; and discharge by way of nozzles 31 into the turbine 43 at a plurality of inlet passageways.

If desired, a conventional exhaust valve may still be employed at the top of the cylinder but timed to open later, as in the two valve arrangement described with respect to FIGS. 1 and 2 after the useful blowdown energy has been expended through the nozzle 31. Such valve is required in four cycle engines. The design of FIGS. 3–5 has both advantages and disadvantages over the two-valve arrangement described with respect to FIGS. 1 and 2. The disadvantage is that in the case of four-cycle engines, a means must be provided to prevent the piston motion from reopening the nozzle valve port one crankshaft revolution later when the piston is at the ending of an intake and the beginning of a compression stroke. Therefore, and only in the case of the four-cycle engines, special valve arrangement must be provided to block the nozzle path to the turbine on every other crank shaft revolution when the piston is down. This may be accomplished by any of the valve means shown in FIGS. 3–5. Specifically, the valve may be a slide valve 55, FIG. 3, which is opened by cam 57 against spring 59. This type of slide valve is also sometimes referred to as a sleeve valve design. Basically it operates to slide an impermeable sleeve across the aperture in the throat of the nozzle 31. When open, however, the boundary of the aperture provides a smooth wall that blends into the smooth flow nozzle to prevent pressure losses or flow disturbance. A variable nozzle-throat-valve is shown in the embodiment of FIG. 4. Therein, the valve 61 operates similiarly as did the valve 51 of FIG. 2. Expressed otherwise, it pivots about the shaft 63 responsive to movement of push rod 65.

FIG. 5 illustrates another design possibility for closing the side port on alternate revolutions which provides a "nozzle valve shaft" that turns at one-fourth crank shaft speed (½ cam shaft speed) and which has open slots 67 in the shaft 69 through which each respective nozzle discharges during blowdown. One crankshaft revolution later, the slots would be at 90° and would be closed to prevent flow of fluid at the beginning of the compression stroke. One more revolution and the nozzle slots are 180° and are therefore correctly open again.

The advantages of these side port designs include the simplicity of design arrangement that allows the turbine to be located at the side of the engine block, rather than at the already crowded head location. The location of the turbine and the other engine design arrangements needs to be optimized, however, to take advantage of the much smaller exhaust valve and port needs in the head area and especially to make use of the increased space thereby made available for the intake valve and port. This improves the operation of the engine and the intake design by increasing air flow capacity. Another important advantage is that this allows simple and clean path for blow down of the combustion products out of the cylinder, eliminating the usual poppet valve throttling and its heating and cooling problems. Since most of the high temperature, high velocity of blow down combustion products are avoided in the upper cylinder combustion chamber, that important area will run much cooler, thereby allowing the use of higher compression ratios with a given fuel octane, thereby producing still another incremental efficiency improvement not otherwise available.

Figure 6:
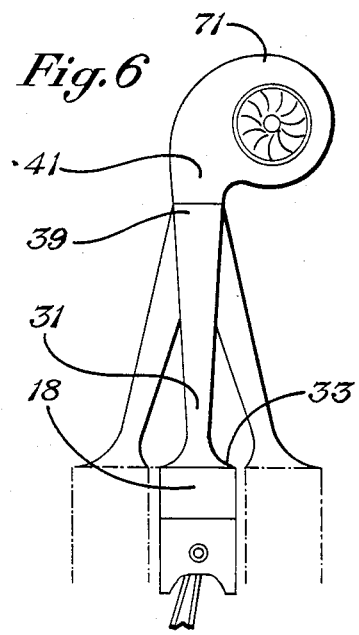
FIG. 6 is a schematic illustration showing a plurality of converging cylinder nozzles discharging into a single inlet of a radial flow turbine in accordance with still another embodiment of this invention.

A different embodiment for improved turbine efficiency is illustrated in FIG. 6.

Referring to FIG. 6, a plurality of respective cylinders 18 are connected to respective nozzles 31 having their respective inlet ends 33 contiguous respective boundary walls of respective combustion chambers and having their respective discharge ends 39 connected smoothly with inlet 41 of the turbine 71. In the illustrated embodiment, the turbine 71 is preferably a radial flow turbine with the grouped engine cylinders 18 tending to integrate the otherwise pulsating exhaust blowdowns from the respective cylinders. As is recognized, the greater the number of cylinders that can be connected in the illustrated way with the turbine, the more efficient will be the operation of the properly designed turbine because the more nearly constant will be the flow of the combustion products.

While developing a rigorous analysis of the highly thermodynamic cycle is difficult, texts such as the Obert and Taylor references, indicate that from the usual unsupercharged engine operating at sea level and at a midrange speed of about 2000 RPM (revolutions per minute) when at full throttle, the cylinder pressure remaining at exhaust valve opening will typically be 50 pounds per square inch absolute or more. If it is assumed that these gases are allowed to "blow down" efficiently through a smooth nozzle into a turbine that is first assumed to be 100% efficient, there should be an additional recovery of about 35–55% of the shaft power already being recovered from the fuel burned in the engine. It is important to reiterate that a sizeable portion of this additional power is recoverable with no degradation of the normally developed piston power. Consequently, the engine power output is increased by the amount of the turbine power that is recovered with no increase in fuel consumption and no appreciable increase in power losses. Thus with turbine efficiency in the range of 50–75%, at least 20–30% increase in power and in overall engine efficiency is possible with this invention.

Figure 7:
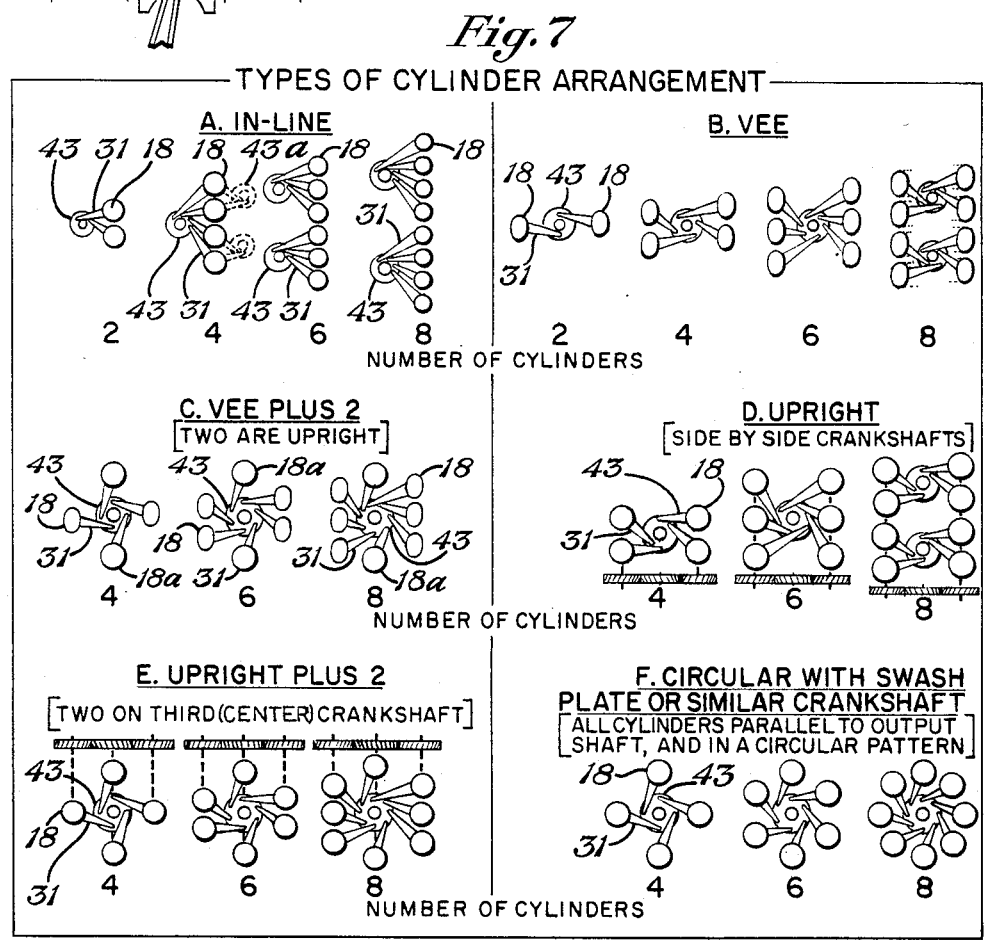
FIG. 7 is a schematic illustration of respective arrangements of turbo compound engines employing varying numbers of cylinders and types of cylinder arrangements in conjunction with respective turbine locations that will accommodate the respectively adjacent cylinders/nozzles/turbine(s).

An important design consideration is to maximize the duty cycle of each turbine by careful cylinder arrangement and turbine placement so that as many cylinders as possible can share a single turbine while maintaining close cylinder-nozzle-turbine proximity within the scope of the claims appended hereto. The more exhaust pulses a given turbine receives per unit time with the same efficiency of transmission, the less idle time the turbine will have to produce windage losses (idle spinning). Moreover, the more cylinders that can be connected via nozzles as described hereinbefore to a single turbine with a given engine, the fewer turbines will be required. A number of engine-turbine arrangements are shown in FIG. 7. For example, with in-line engine shown by A., two cylinders 18 connected by two nozzles 31 with a single turbine 43 are illustrated at the top left. When four cylinders are employed, a single turbine 43 may be employed with arrangement such as illustrated; or two turbines 43a shown in dashed lines can be employed. Similarly, with six and eight cylinders in line, at least two turbines 43 may be required. In a Vee arrangement such as shown in B., the turbine 43 can be located intermediate and connected via respective nozzles 31 with the cylinders 18 as shown for the respective 2,4,6 and 8 cylinder arrangements. As shown in C., the Vee plus 2 (2 are upright) arrangements are shown with the turbine 43 located intermediate the cylinders 18 and the upright cylinders 18a for, respectively, the 4,6 and 8 cylinder engines. For the arrangement shown in D., employing an upright arrangement with side by side crankshafts, the turbine 43 can be located intermediate the cylinders 18. Similiarly as shown in E. and F., the turbine 43 can be located intermediate the cylinders 18 and still have the nozzles 31 with the respective inlet and discharge ends connected, respectively, with the boundary wall of the combustion chamber and the turbine.

Figure 8:
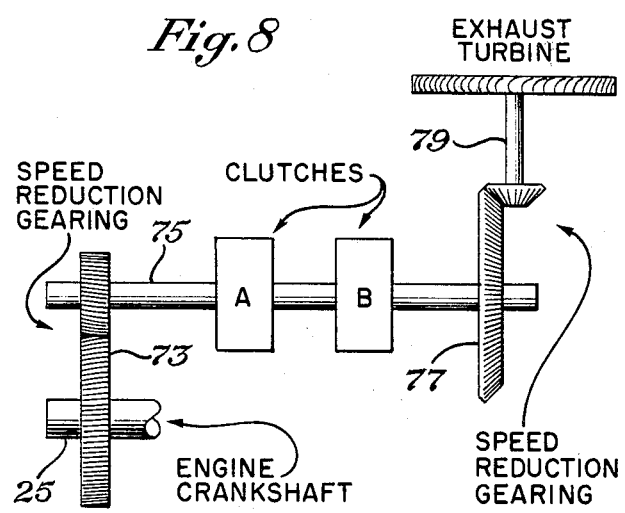
FIG. 8 is a schematic illustration showing apparatus for connecting the exhaust turbine shaft and the engine crankshaft for greater power output in accordance with one embodiment of this invention.

The coupling of the turbine to supplement useful shaft output is shown in the prior art; for example, U.S. Pat. No. 2,245,163. The coupling of the two efficiently so that high inertia loads in the coupling components are avoided, and so that the turbine never becomes parasitic (consuming engine power) are two of the basic problems of the practical execution of any turbo-compounding of internal combustion engines, including this invention. The problem exists because of the dissimilarity of the inherent characteristic speeds of conventional reciprocating engines versus their exhaust driven turbines. To simply direct-couple the two mechanically, which would be preferred from a cost and efficiency standpoint, requires a large-ratio geared speed reducer for the turbine. Such coupling has inherent problems with high inertial loads produced by sudden speed changes that are typical in automotive applications (and in aircraft and boats to a lesser extent). These sudden changes are amplified by the large speed ratio gearing. These sudden speed changes occur typically with sudden application of power without load, sudden application of load, and transmission gear changes. There is, therefore, a need to provide flexible coupling by some means to avoid damaging high inertial loads. One means for coupling the turbine to engine shafts in accordance with one embodiment of this invention is illustrated in FIG. 8. Therein, A and B are clutches of two different types intermediate the speed reduction gearing 73 connecting the engine crankshaft to the output shaft 75 and the speed reduction gearing 77 connecting the turbine shaft 79 to the shaft 75. The locations of the clutches A and B are illustrative only and are not limiting. Clutch A is a unidirectional clutch which is designed to transmit torque in one direction only and to inherently release fully and automatically in the opposite direction. Such type clutches may be seen in a variety of texts. For example, see an overriding clutch, FIG. 198 on page 262, DESIGN OF MACHINE MEMBERS, Vallance and Doughtie, McGraw-Hill, New York, N.Y., 4th edition, 1964. This clutch eliminates all possibility of engine power consumption by the turbine and inertial shock loads in that torque direction.

Clutch B is a limited torque clutch which may be any of many available designs. For example, the limited torque clutch B may comprise a plate-friction clutch; a disc type clutch; multiple discs clutch; cone clutch; centrifugal clutch; drum clutch; band clutch; or magnetic clutch; operating dry or wet. Also, a viscous or hydraulic fluid coupling is another example of a limited torque design that can be employed. This clutch would be designed to slip only when excessive inertial loads exist, and might be integrated into the unidirectional clutch A.

Some other possibilities for connecting the output shaft of the turbine back to the engine crank shaft, or to a common shaft, are as follows: 1. direct gearing with sufficient strength, elasticity and damping to sustain inertial loads. 2. gearing and fluid coupling such as used in the Wright turbocompound. 3. gearing and fast decoupling means to avoid excessive torques. Decoupling will include clutches that are disengaged by some controller or by slipping due to inherently having less than damaging torque capacity. This arrangement is substantially similiar to the one illustrated in FIG. 8. Generator/motor sets can be employed, employing alternating current (AC) or direct current (DC). In the case of alternating current, part of the needed speed change could be effected by a design using a small number of magnetic poles on the turbine/alternator (high speed) and a large number of poles on the motor (slow speed). Such an arrangement could be designed to run efficiently as asynchronous machines with their inherent slip capability. Such generator/motor units may be single integrated units having magnetic couplings or can incorporate permanent magnet elements on one and a variable number of electromagnetic poles on the other. 5. a generator type of arrangement employing a generator or alternator with rectifier and storage battery and DC motor could be employed although this arrangement may not be efficient. Similiarly, turbine/-hydraulic hydraulic motors, with or without accumulators; and flywheels can be employed to enable storing energy and matching the energy to the need.

In TRANSACTIONS OF THE SOCIETY OF AUTOMOTIVE ENGINEERS (SAE), volume 62, 1954, data shows that the Wright Turbocompound engine operating at "takeoff power" at sea level conditions has kinetic power available in the exhaust gases amounting to 79% (percent) of the net piston power being recovered by the engine crankshaft. Exhaust turbines recovered power amounting to 18.2% of the net piston power, which was only 23% of that kinetic power available. At "cruise power", roughly equivalent to a naturally aspirated engine operating at full load, the available exhaust gas kinetic power was 55% of the piston power. The net recovered by the turbines was 9.5% or only 17.4% of available kinetic power. These figures are based on that 18 cylinder radial aircraft engine using three blowdown turbines with 6 cylinders supplying each through rather crooked and conventional "lossey" exhaust pipes and manifolds with conventional exhaust poppet valves. At sea level operating conditions, energy loss percentages attributed to the exhaust valve throttling were about 36% of takeoff and 31% of cruise piston power, which is 45% and 57%, respectively, of the available kinetic power available. The purpose for this invention is to effectively convert these losses to useful output. The above data is tabulated in Table 1 for easy reference.

TABLE I

Wright Turbo Compound Engine Power Data
(Information taken from SAE Transactions, Vol. 62, 1954)

| Exhaust Energy Recovery Parameters | Sea Level | | Critical Altitude | |
|---|---|---|---|---|
| | Take Off Power | Cruise Power | Take Off Power | Cruise Power |
| Available Exhaust Gas Kinetic Power (% of Piston Power) | 78.5 | 54.8 | | |
| Net Turbine Energy Recovered: | | | | |
| (% of Piston Power) | 18.2 | 9.5 | 26 | 19 |
| (% of Available Kinetic) | 23.1 | 17.4 | | |
| (% of that Remaining after Exhaust Valve Throttling) | 42.8 | 40.4 | | |
| Exhaust Valve Throttling Loss: | | | | |
| (% of Piston Power) | 36.0 | 31.3 | | |
| (% of Available Kinetic) | 45.4 | 57.1 | | |

The given data supports the benefits of turbo-compounding. The design of this invention, however, greatly reduces the high losses shown, significantly increases the percentage of net turbine energy recovered and improves on the reported results by moving losses into the net turbine output category.

As indicated hereinbefore, spark ignition engines may realize the greatest benefits of this invention. It is important to note that this invention can include the combination of supercharging along with that of compounding if desired. Such supercharging can be done with or without inner cooling after one or more compression stages as in conventional practice.

In operation, with a conventional internal combustion engine, the intake admixture of fuel and air is taken in through the inlet manifold means 19 through the opened intake poppet valve 27 and sucked into the combustion chamber 37 as the piston 15 moves downwardly. Thereafter, the piston is reversed in its traversal, moving upwardly and compressing the fuel air mixture. At a certain number of degrees before top dead center, the fuel-air mixture is burned through ignition of a spark plug (not shown). The spark plug is fired with conventional arrangement in which means such as a collapsing primary induces high voltage in a secondary coil that causes an electric arc across gaps in the spark plug. In any event, the combustion of the fuel in the air under combustion supporting conditions develops thermal power and causes a high pressure; thereby forceably moving the piston 15 downwardly to cause rotation of the engine crankshaft 25 and develop shaft power output of the engine. Thereafter, the exhaust port 21 is opened to discharge the hot combustion products at their elevated pressure directly into the nozzle 31 and smoothly into the inlet of the turbine 43 without the irreversible pressure and cooling losses associated with this process in the prior art conventional engines. The exhaust gases flow through the turbine, forceably spinning the turbine blades, developing power and rotating the turbine shaft 79. The output of the turbine shaft is then employed as desired. This may be by either compounding with the engine crankshaft as illustrated in FIG. 8 or rotating a compressor as shown in prior art such as U.S. Pat. No. 3,673,798. Of course, both can be employed if desired for using the power, or any other power application as hereinbefore mentioned.

As implied hereinbefore, the low pressure, low velocity, spent exhaust gases then pass through the discharge passageway of the turbine 43 to the conventional exhaust system.

The cycle is repeated for each of the respective cylinders. The timing of the repetition will depend upon whether it is a two-cycle or a four-cycle engine. Moreover, the best arrangement for valving and the like will depend upon whether it is a two-cycle or a four-cycle engine.

In accordance with usual practice, the engine will be cooled by air or a circulated liquid; such as, water or an aqueous solution of diethylene glycol. The engine will be lubricated by conventional lubrication circulation means through respective lubrication passageways (not shown).

From the foregoing it can be seen that this invention provides an advanced turbo compound engine that has a surprisingly high efficiency and recovery of theoretical available energy. In summary, this invention achieves the objects delineated hereinbefore.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. In combination with an internal combustion engine having at least one cylinder carrying a respective reciprocally movable piston, a respective cylinder head closure on said at least one cylinder and closing the end of the respective said cylinder to define a respective combustion chamber with respect to said cylinder piston, inlet manifold means connected with said cylinder for conveying at least an oxygen-containing gas thereto, means for admixing incoming fuel with the oxygen-containing gas, ignition means for firing the fuel in the oxygen-containing gas, to develop power, and exhaust port for the periodic discharging of hot, high pressure combustion products from said cylinder, said exhaust port being disposed in a respective boundary wall of the combustion chamber or cylinder; the improvement comprising:

(a) at least one respective nozzle means adapted for accelerating and conveying the hot, high pressure combustion products from the respective said cylinder to a turbine, said nozzle means having inlet and discharge ends and having its said inlet end contiguous said boundary wall at said exhaust port and sealingly encompassing said exhaust port so as to prevent leakage of said hot, high pressure combustion products to the atmosphere;

(b) a valve means;

(c) means coupled to said valve means for controlling said valve means to allow cylinder combustion gases to flow through the nozzle means near the end of the expansion (power) stroke of the piston; and (d) at least one turbine having respective inlet and discharge passageways and an output shaft for delivering power and disposed closely adjacent the nozzle means and having its inlet passageway connected with said discharge end of said nozzle means and sealingly connected therewith so as to prevent leakage of said expanded, high velocity combustion products to the atmosphere and constraining said expanded, high velocity combustion products to pass through said turbine, thereby giving up their energy to said turbine to become low pressure, low velocity exhaust gas, said discharge passageway conveying said low pressure exhaust gas away from said turbine;

said nozzle and valve means including a combination variable geometry nozzle throat valve that varies the nozzle during blowdown beginning with a convergent-divergent nozzle structure at high cylinder pressures so as to produce supersonic flow at initial high cylinder pressures and progresses with smaller discharge end-to-throat area ratios to a simple converging nozzle structure for sonic and slower flows at the succeedingly lower cylinder pressures, that provides variable nozzle shapes throughout the valve opening sequence and that eliminates otherwise irreversible valve throttling losses ahead of said nozzle means, thereby maximizing the nozzle exit gas velocity and energy recovery by the turbine whereby said output shaft of said turbine can deliver power efficiently removed by said variable geometry nozzle valve and said turbine from said hot, high pressure cylinder combustion gases.

2. The combination of claim 1 further comprising a cam to rotate in synchronism with the engine for operating said valve means.

3. The combination of claim 1 wherein said valve means comprises at least two exhaust valves, one of said valves opening early to discharge directly through said nozzle means; and a second exhaust valve opening later, discharging remaining low pressure gas as the piston rises.

4. The combination of claim 1 wherein said internal combustion engine is a two-cycle engine; said exhaust port is a side exhaust port disposed in the lower half of said cylinder wall so as to be covered by a side of said piston during a portion of its stroke, and to be uncovered by said side during another portion of its stroke, and said nozzle means is contiguous said side exhaust port and said turbine.

* * * * *